Feb. 15, 1927.
G. A. E. MELLIN
1,617,718
CERTIFICATE HOLDER
Filed Jan. 21, 1925    2 Sheets-Sheet 1
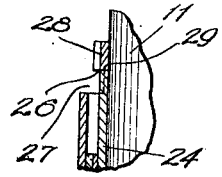
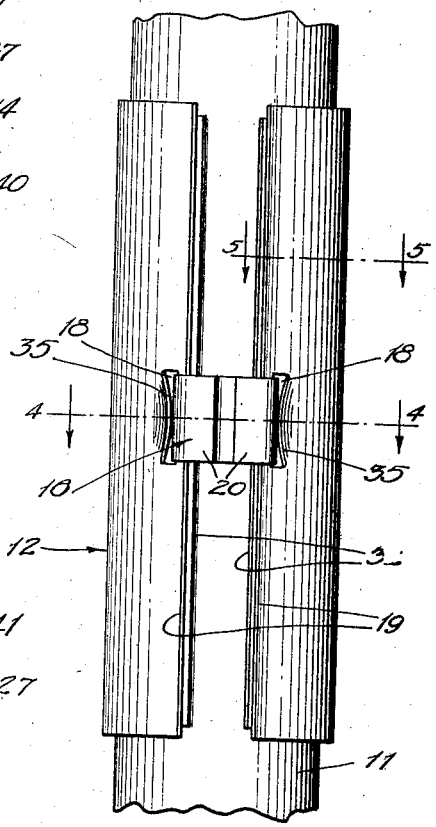
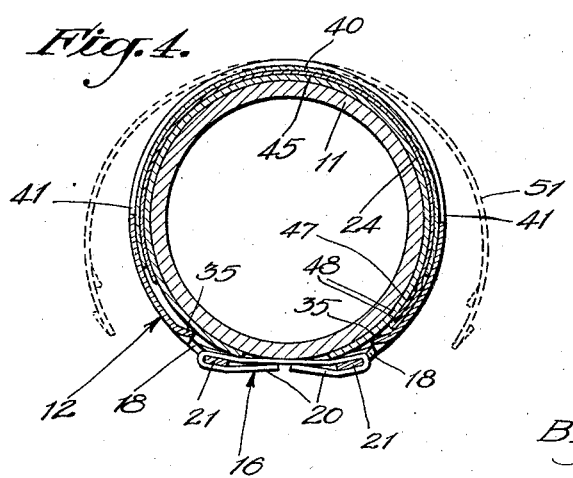
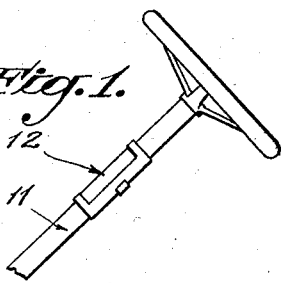
INVENTOR:
GUSTAF A. E. MELLIN,
BY
Ford W. Harris
ATTORNEY.

Feb. 15, 1927.

G. A. E. MELLIN 1,617,718

CERTIFICATE HOLDER

Filed Jan. 21, 1925  2 Sheets-Sheet 2

INVENTOR:
GUSTAF A. E. MELLIN
BY
Fred W. Harris
ATTORNEY.

Patented Feb. 15, 1927.

1,617,718

UNITED STATES PATENT OFFICE.

GUSTAF A. E. MELLIN, OF LOS ANGELES, CALIFORNIA.

CERTIFICATE HOLDER.

Application filed January 21, 1925. Serial No. 3,771.

My invention has to do with certificate holders, and it relates particularly to one adapted for use on automobiles or other similar vehicles. Law requires that a certificate of registration of a vehicle be carried by such a vehicle in a visible location so that it may be easily read. On automobiles the certificate of registration is generally carried in a metal frame which is secured in an unobscure place.

It is an object of my invention to provide a certificate holder of this character which is adapted for securement to the steering post of an automobile. My invention provides a plate which is adapted to conform to the contour of the steering post, this plate having a window formed therein through which a certificate enclosed by the plate is visible.

It is another object of my invention to provide a certificate holder of this character which is cheap to manufacture, and which is exceedingly easy to install. The plate is provided in semi-cylindrical form so that opposite ends thereof are brought into approximate adjacency. When installing the holder, the certificate of registration is first placed on a back, and then placed inside the plate so as to be under the window of the plate. The plate is distorted so as to distance the adjacent ends of the plate to permit its placement around the steering post. Openings are formed near these ends through which a strap is extended, this strap being for the purpose of pulling the ends together, thus securing the holder to the exterior of the steering post.

It is a further object of my invention to provide in a certificate holder of the character mentioned, a means for centralizing the back. I accomplish this by forming confining walls near the edges of the plate, these confining walls being adapted to engage edges of the back, thus preventing it from moving from place.

It is another object of my invention to provide a means for adjustably holding the certificate to the back while the holder is being installed. I provide an endless member which extends around the back and extends around a portion of the certificate. This member is preferably elastic, and may be a rubber band. The member serves to hold the certificate in a desired position while the different parts of the holder are being installed on a steering post.

It is also an object of my invention to provide a means for securely holding the back in proper position. I accomplish this by turning the adjacent ends of the plate member inwardly towards the center. When the plate is installed, these inwardly turned ends forcibly engage the back member, thus restraining it from moving from its proper position.

Other objects and the salient advantages of my invention will be made evident hereinafter.

Referring to the two sheets of drawings which are for illustrative purposes only, Fig. 1 is a view illustrating the utility of my invention.

Fig. 2 is an enlarged front view of a certificate holder embodying the features of my invention, this certificate holder being installed on a steering post.

Fig. 3 is an enlarged view of my certificate holder, this view being taken to illustrate the manner in which the plate is secured around the post.

Fig. 4 is an enlarged cross sectional view taken as indicated by the line 4—4 of Fig. 3.

Fig. 6 is an enlarged fragmentary view taken as indicated by the line 6—6 of Fig. 2.

Figure 7:
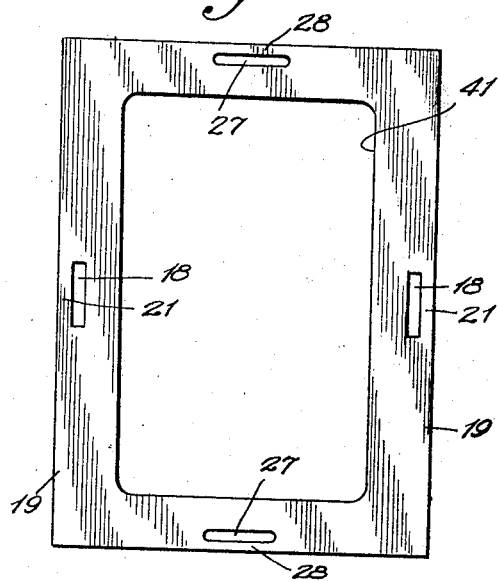
Fig. 7 is a view showing the plate previous to its being bent into curved shape.

With reference to Fig. 1 of the drawings, the numeral 11 indicates a steering post on which a certificate holder 12 embodying the features of my invention is installed. The certificate holder 12 provides a cylindrical shaped plate 14 which extends around the steering post 11. The plate 14 is formed from a flat member as shown in Fig. 7. The plate 14 is secured in place by means of a strap 16 which extends through openings 18 provided near adjacent ends 19 thereof, as clearly shown in Figs. 3 and 4 of the drawings. The strap 16 has ends 20 bent around web portions 21 of the plate 14, thus holding the plate 14 tightly in place. The web portions 21 are pressed outwardly so as to provide a space between the periphery of the post and these web portions for the extension of the strap therebetween.

Retained inside the plate 14 against the steering post 11 is a back 24 which is preferably made of cardboard. The edges of the plate 14 have confining walls 26, as clearly shown in Fig. 6, provided adjacent thereto. These confining walls 26 are preferably made by cutting a slot 27 in the plate 14 and pressing a web portion 28 inwardly as clearly shown in this figure. The confining walls 26 are adapted to engage with the edges 29 of the back 24 for centralizing this back and preventing a relative longitudinal movement between this back and the plate 14.

Figure 5:
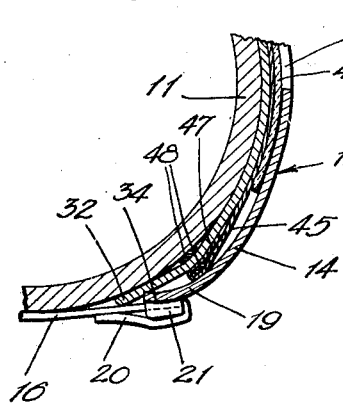
Fig. 5 is an enlarged fragmentary sectional view taken as indicated by the line 5—5 of Fig. 3.

As clearly shown in Fig. 5, the ends 32 of the back 24 extend slightly farther than the ends 19 of the plate 14. At each side of the openings 18, the ends 19 are turned inwardly towards the center as indicated at 34 in Fig. 5. These inwardly turned edges 34, when the plate 14 is in place, forcibly engage said back member, imbedding in the surface thereof and tightly gripping the back member so as to positively restrain it from moving out of proper position. The walls 35 of the slots 18 are also bent inwardly so as to engage the back 14.

A window 40 is provided in the form of a rectangular opening 41 provided in the plate 14, which opening 41 has a transparent member 43 extending thereacross. This transparent member 43, in the modification shown in Figs. 1 to 7, inclusive, of the drawings, is of slightly larger size than the opening 41 and is cemented to the inner face of the plate 14.

Figure 8:
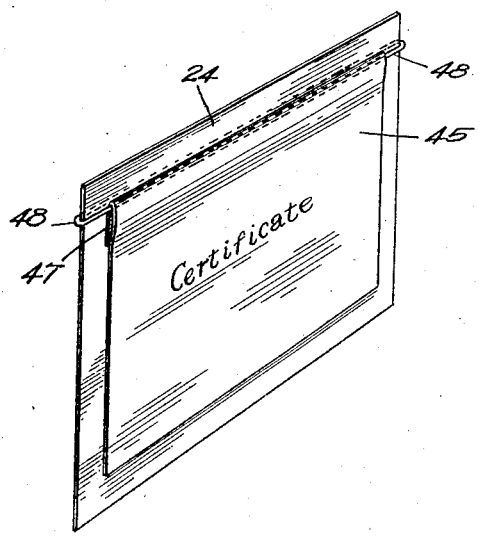
Fig. 8 is an enlarged perspective view showing the manner in which a certificate is held to a back of the certificate holder of my invention.

A certificate of registration 45 or other paper which is to be displayed is placed below the window 40 so as to be visible therethrough, this certificate 45 being placed between the transparent member 43 and the back 24. When installing the certificate holder, the certificate 45 is first placed on the back 24 in its proper position. As shown clearly in Fig. 8, the upper end 47 of the certificate 45 is folded back on itself, and extends between the other portion of the certificate and the back 24 as shown. An endless flexible holding member, which may be in the form of a rubber band 48, is then placed as shown, this member 48 extending around the back 24 and extending between the folded portion 47 of the certificate 45 and the other portion thereof. This holds the certificate in position during the installation of a certificate holder but permits the certificate to be adjusted to a desired position. After this preparation, the back holding the certificate thereon is then placed inside the housing or plate 14 so that the certificate rests below the window 40 and is visible therethrough. The assembly is then placed on the steering post 11. When placing this assembly on the steering post, it is necessary to spread the parts as indicated by the dotted lines 51 of Fig. 4 so that they may be brought into a position surrounding the steering post 11. The strap 16 is then extended through the slots 18 as clearly shown in Fig. 4, and the ends 20 are bent over, the strap being adjusted so as to tightly constrict the plate 40 around the post 11. This brings the turned-in portions 34 of the ends 19 forcibly into engagement with the ends of the back 24. When the plate 14 is thus clamped in place, the flexible member 48 as shown clearly in Fig. 5 is compressed between the faces of adjacent parts and thus frictionally or grippingly retains the certificate 45 in its proper position.

Figure 9:
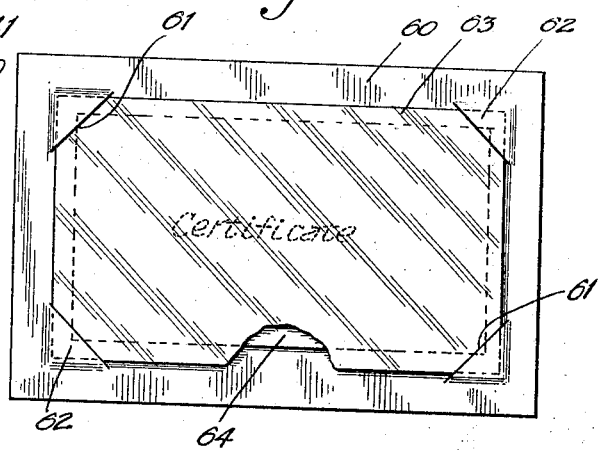
Fig. 9 is a view illustrating another manner for holding the certificate in proper position.

Shown in Fig. 9 is an alternative manner of holding the certificate in place. With reference to this figure, I provide a back 60 having slits 61 provided therein near each corner. The corners 62 of a transparent member 63 are extended through these slits 61 as shown. Between adjacent faces of the back 60 and the transparent member 63 I place a certificate 64. The contact of the back and transparent members 60 and 63 serves to retain the certificate 64 in its proper position. This assembly is then placed inside a housing so that the transparent member 63 and the certificate 64 rest below an opening in such a housing. In this modification, the transparent member 63 is not in any way cemented or secured to the housing as is done in the first modification of my invention.

The certificate holder of my invention is very cheap to manufacture, there being few parts which may be cheaply made by automatic machinery. The holder is very easy to install as previously described.

By providing a certificate holder arranged for installation on a steering post, it is possible to position the certificate in a place in which it may be readily observed. The installation of my certificate holder requires no special provision and in no way mars or scratches because of the cardboard back 24.

I claim as my invention:

1. In combination with a steering post: a plate, said plate being adapted to extend around said steering post; a strap for securing said plate in place; a back disposed within said plate; confining walls formed on said plate, said confining walls consisting of indented portions on said plate and being arranged for engaging said back, thus retaining said back in place; and a certificate arranged between said plate and said back.

2. In combination with a steering post: a plate, said plate being adapted to extend around said steering post; a strap for securing said plate in place; a back disposed within said plate; confining walls formed at the ends of said plate, said confining walls consisting of indented portions on said plate and being arranged for engaging said back, thus retaining said back in place; and a certificate arranged between said plate and said back.

3. In combination with a steering post: a plate, said plate being adapted to extend around said steering post; a strap for securing said plate in place; a back disposed within said plate; confining walls formed at the ends of said plate by cutting slots in said plate and indenting the webs adjacent said slots, said confining walls being arranged for engaging said back, thus retaining said back in place; and a certificate arranged between said plate and said back.

4. In combination with a steering post: a plate, said plate being adapted to extend around said steering post and having slots in the ends thereof adapted to be disposed adjacent each other when said plate is extended around said post; a strap for securing said plate in place, said strap consisting of a flexible member arranged to extend through said slots and to be retained in place by the bending over of the ends thereof; a back disposed within said plate; confining walls formed at the ends of said plate by cutting slots in said plate and indenting the webs adjacent said slots, said confining walls being arranged for engaging said back, thus retaining said back in place; and a certificate arranged between said plate and said back.

In testimony whereof, I have hereunto set my hand at Los Angeles, California, this 16th day of January, 1925.

GUSTAF A. E. MELLIN.